US011893456B2

(12) United States Patent
Tedaldi et al.

(10) Patent No.: US 11,893,456 B2
(45) Date of Patent: Feb. 6, 2024

(54) DEVICE TYPE CLASSIFICATION USING METRIC LEARNING IN WEAKLY SUPERVISED SETTINGS

(71) Applicant: Cisco Technology, Inc., San Jose, CA (US)

(72) Inventors: David Tedaldi, Zurich (CH); Pierre-Andre Savalle, Rueil-Malmaison (FR); Sharon Shoshana Wulff, Zurich (CH); Jean-Philippe Vasseur, Saint Martin d'uriage (FR); Grégory Mermoud, Veyras VS (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 1086 days.

(21) Appl. No.: 16/434,274

(22) Filed: Jun. 7, 2019

(65) Prior Publication Data

US 2020/0387746 A1    Dec. 10, 2020

(51) Int. Cl.
*G06N 20/00* (2019.01)
*H04L 41/0893* (2022.01)
*G06F 18/23* (2023.01)
*G06F 18/241* (2023.01)

(52) U.S. Cl.
CPC .............. *G06N 20/00* (2019.01); *G06F 18/23* (2023.01); *G06F 18/241* (2023.01); *H04L 41/0893* (2013.01)

(58) Field of Classification Search
None
See application file for complete search history.

(56) References Cited

U.S. PATENT DOCUMENTS

| 8,805,752 | B2 | 8/2014 | Kawahara et al. |
| 10,218,726 | B2 | 2/2019 | Vasseur et al. |
| 2008/0184329 | A1* | 7/2008 | Cross .................. G06F 21/6218 726/1 |
| 2011/0004578 | A1 | 1/2011 | Momma et al. |
| 2015/0032882 | A1* | 1/2015 | Hart ........................ H04L 43/04 709/224 |

(Continued)

FOREIGN PATENT DOCUMENTS

| WO | WO-2018224165 A1 | 12/2018 |
| WO | WO-2019098449 A1 | 5/2019 |

OTHER PUBLICATIONS

U.S. Appl. No. 16/194,442, Unpublished, filed Nov. 19, 2018, Mermoud et al.

(Continued)

*Primary Examiner* — Atta Khan
(74) *Attorney, Agent, or Firm* — BEHMKE INNOVATION GROUP LLC; Kenneth J. Heywood; James J. Wong (57) ABSTRACT

In one embodiment, a device classification service receives telemetry data indicative of behavioral characteristics of a plurality of devices in a network. The service obtains side information for the telemetry data. The service applies metric learning to the telemetry data and side information, to construct a distance function. The service uses the distance function to cluster the telemetry data into device clusters. The service associates a device type label with a particular device cluster.

12 Claims, 7 Drawing Sheets

(56) References Cited

U.S. PATENT DOCUMENTS

2019/0287030 A1* 9/2019 Varughese ............. G06N 20/00
2020/0211721 A1* 7/2020 Ochoa ................... G16Y 10/75

OTHER PUBLICATIONS

Babagholami-Mohamadabadi, et al., "Multi-Modal Distance Metric Learning: A Bayesian Non-Parametric Approach", European Conference on Computer Vision, ECCV 2014: Computer Vision—ECCV 2014 Workshops pp. 63-77.

Jonschkowski, et al., "Patterns for Learning with Side Information", online: https://arxiv.org/pdf/1511.06429.pdf, Feb. 10, 2016, 14 pages.

Suarez, et al., "A Tutorial on Distance Metric Learning: Mathematical Foundations, Algorithms and Software", online: arXiv.org >cs> arXiv:1812.05944v1, 92 pages, Dec. 2018.

Xing, et al., "Distance Metric Learning, with Application to Clustering with Side-Information", Advances in Neural Information Processing Systems 15 (NIPS 2002), 8 pages.

"Similarity Learning", online: https://en.wikipedia.org/wiki/Similarity_Learning#Metric_learning, Feb. 11, 2019 (printed May 24, 2019), 2 pages, Wikimedia Foundation, Inc.

\* cited by examiner

DEVICE TYPE CLASSIFICATION USING METRIC LEARNING IN WEAKLY SUPERVISED SETTINGS

TECHNICAL FIELD

The present disclosure relates generally to computer networks, and, more particularly, to device type classification using metric learning in weakly supervised settings.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number different device types on the network will also continue to grow. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its manufacturer (e.g., for software updates) or its supervisory device. Traditionally, this classification has been rule-based whereby a device will be classified by the network as being of a certain type, if the characteristics of the device match that of a predefined rule. While this has been relatively suitable in the past, testing has shown that up to 40% of devices are now classified as being of an 'unknown' type, largely due to the pool of static classification rules not being able to keep pace with the growing body of different device types.

As described herein, machine learning offers a potentially powerful shift in how devices on a network are classified. However, for the same scalability reasons as that of static classification rules, it is also assumed that there will be a limited amount of training data for which the ground truth (e.g., the actual device type) is known. Accordingly, the techniques herein introduce a clustering-based approach that leverages metric learning, to aid in the learning of new device types.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device classification service receives telemetry data indicative of behavioral characteristics of a plurality of devices in a network. The service obtains side information for the telemetry data. The service applies metric learning to the telemetry data and side information, to construct a distance function. The service uses the distance function to cluster the telemetry data into device clusters. The service associates a device type label with a particular device cluster.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
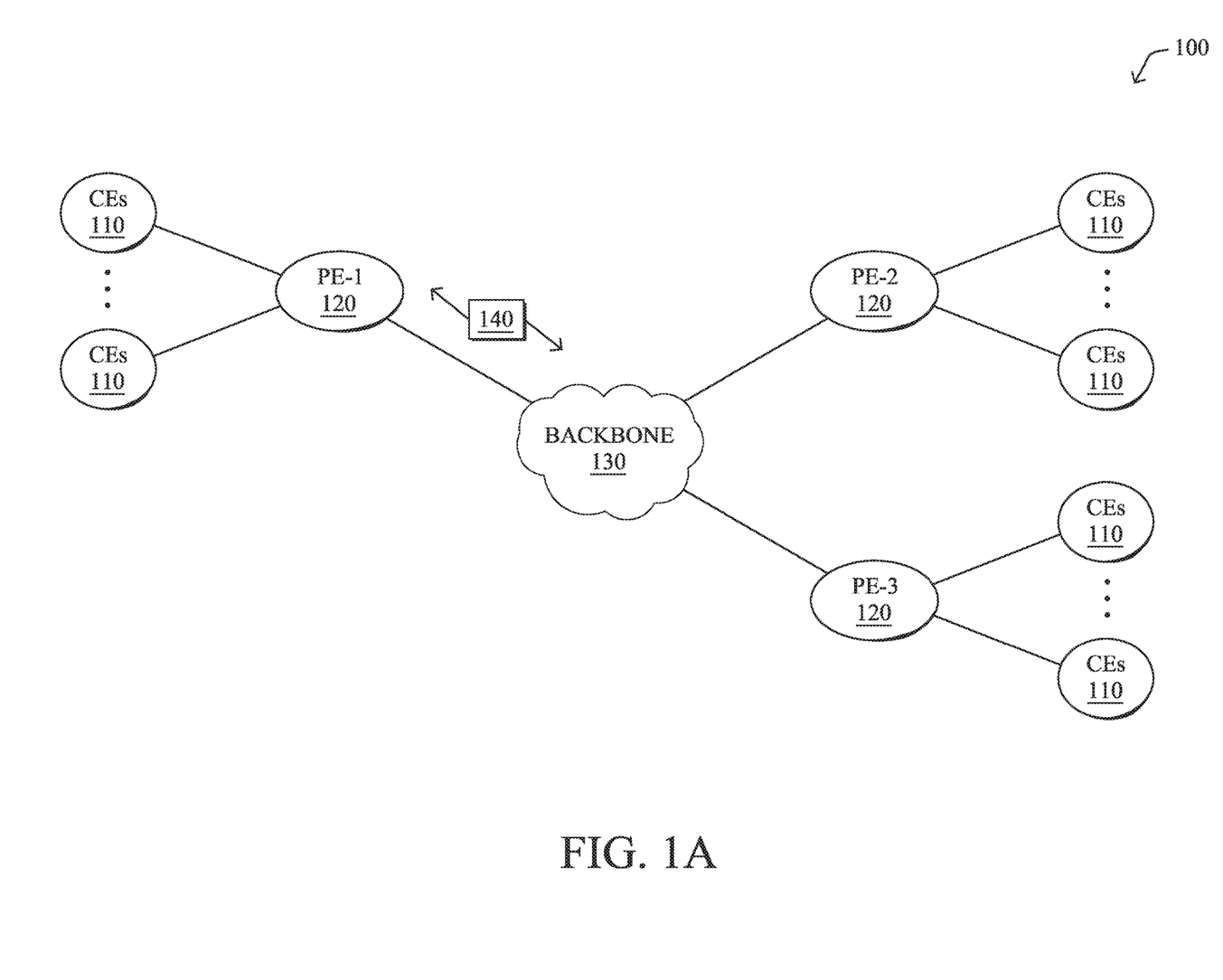
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
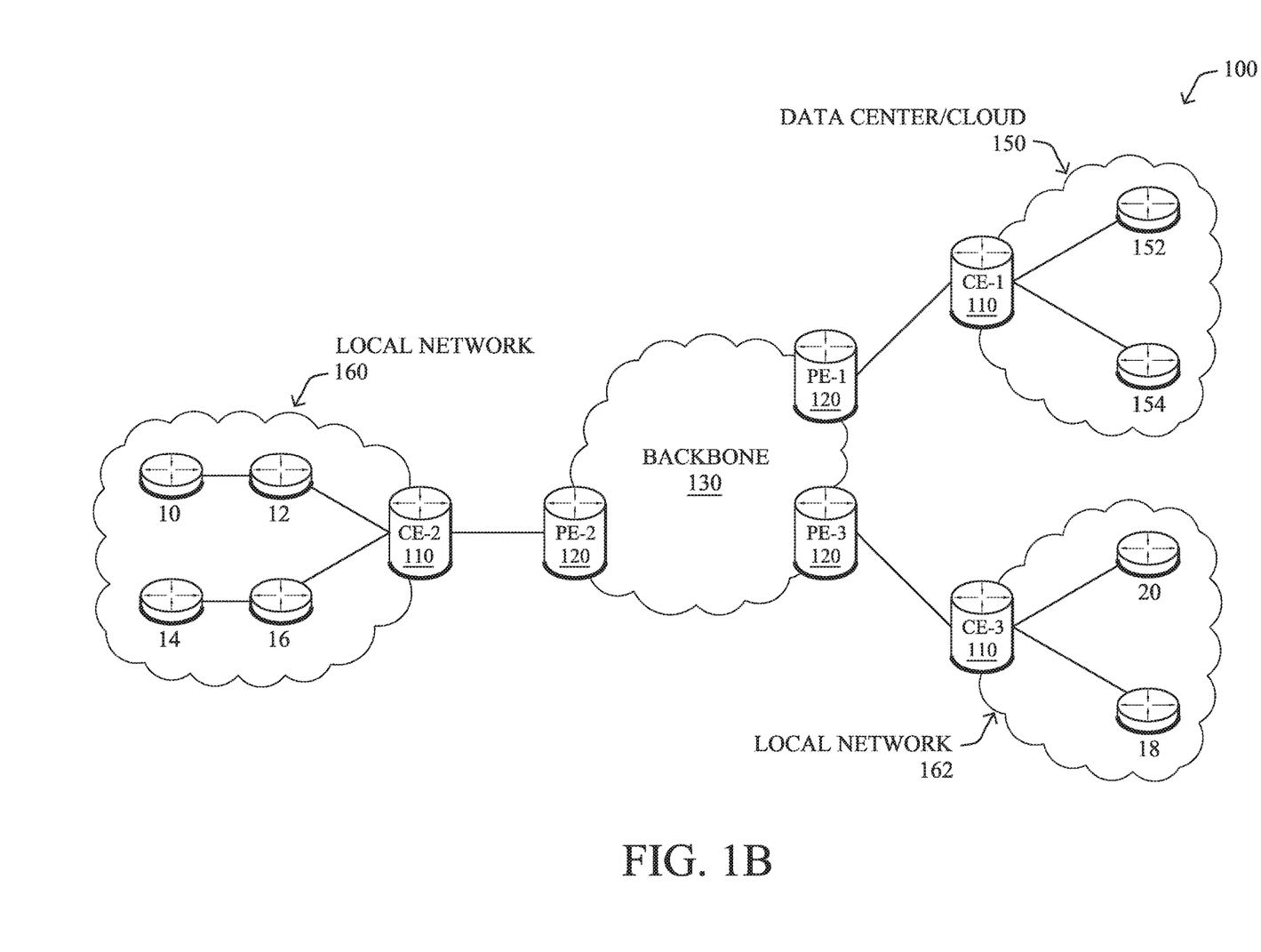

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
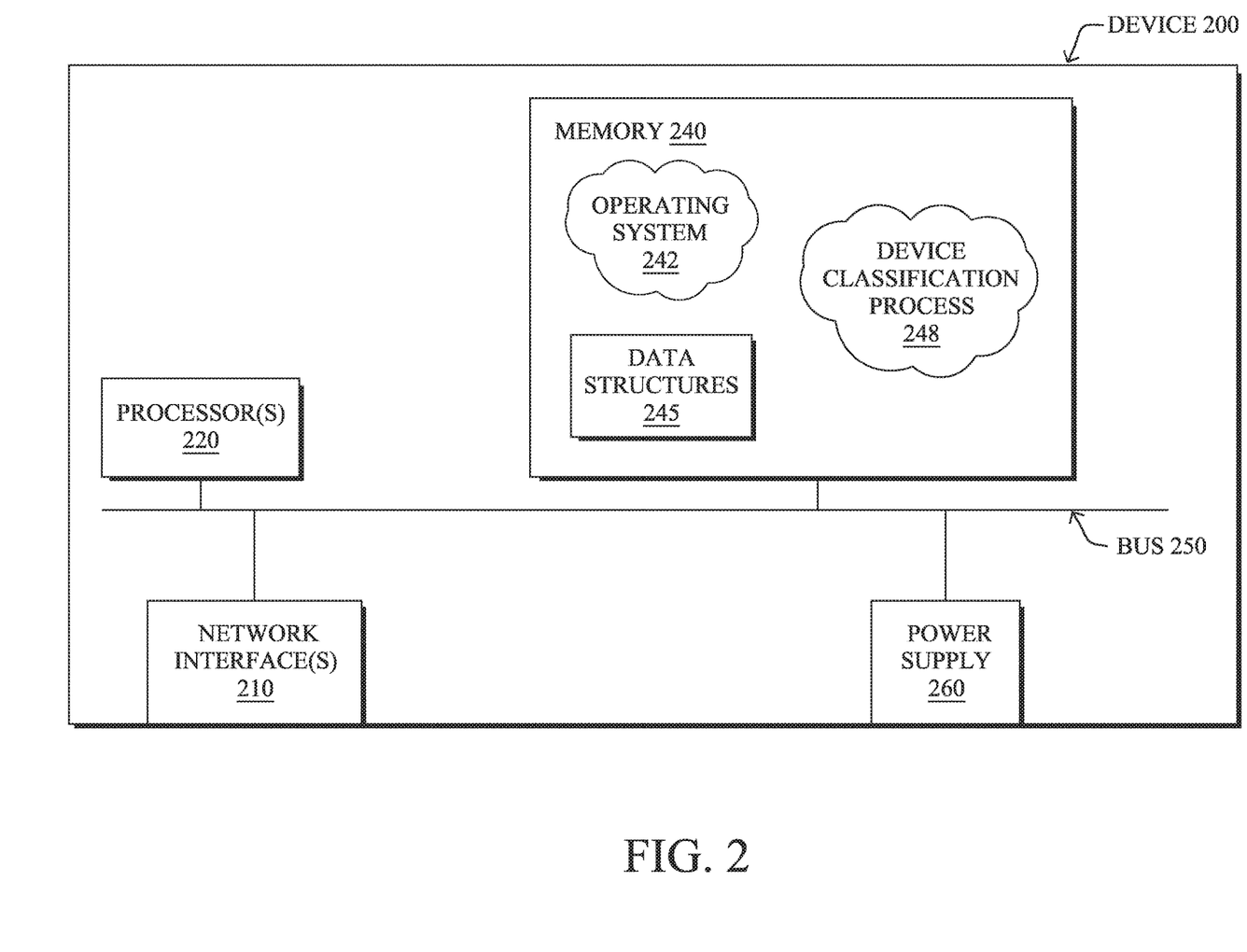
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
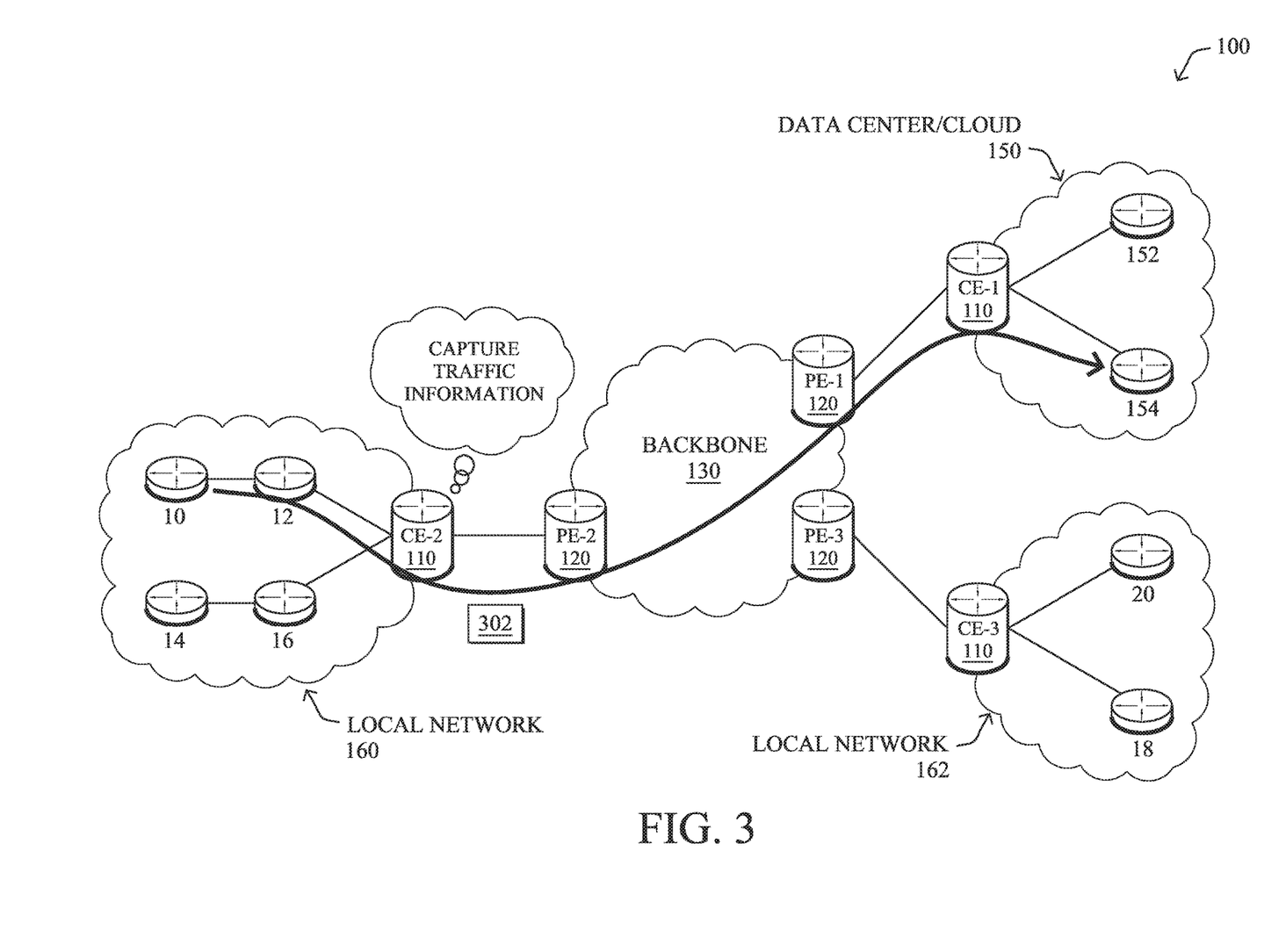
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
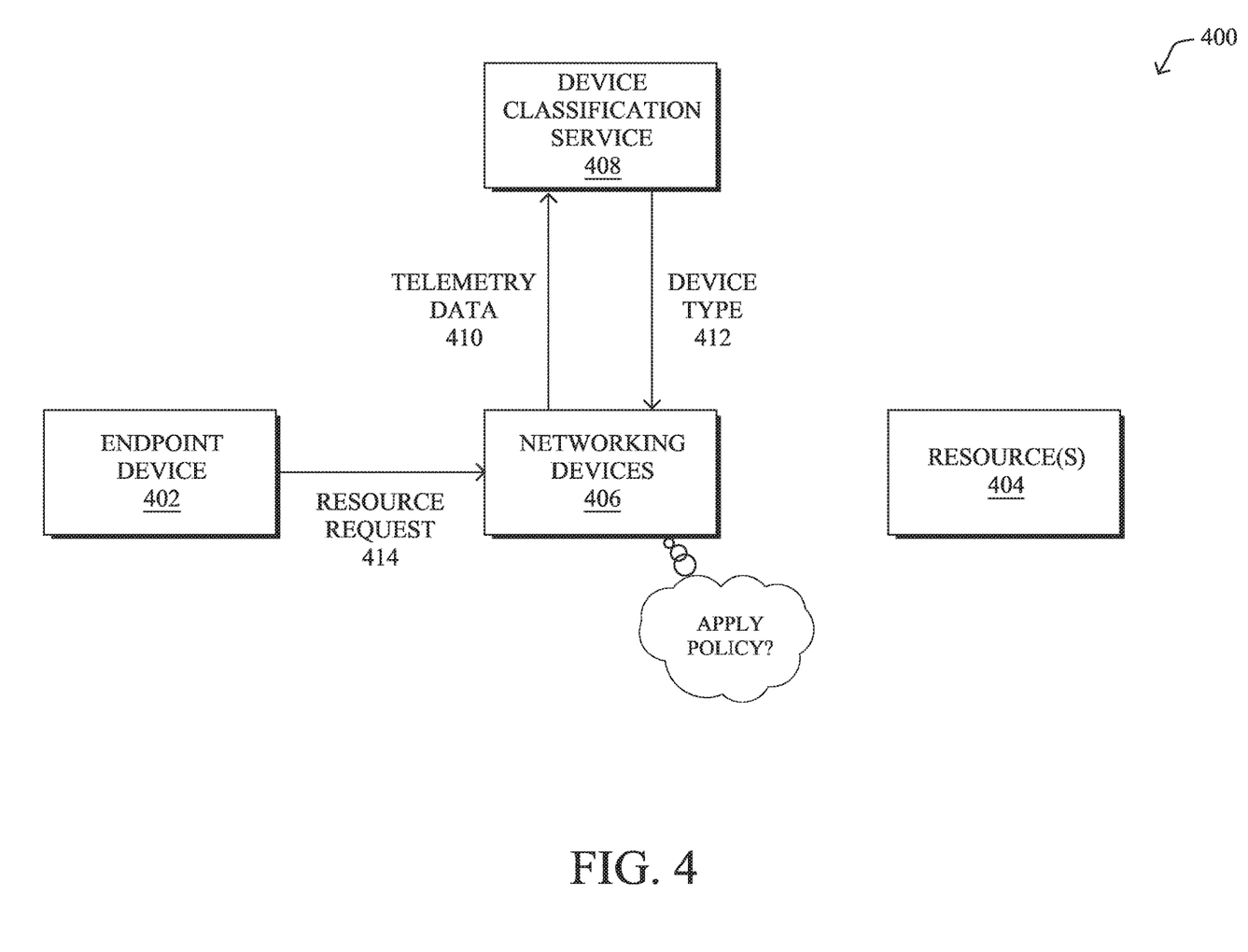
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also, as shown in FIG. 4, is a device classification service 408 that may be hosted on one or more of networking devices 406 or be in communication therewith. Service 408 may, for example, be provided through the execution of device classification process 248. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in INIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

As noted above, typical device classification systems rely on simple rules and heuristics to classify devices. Those heuristics are not always enough for classifying consumer devices. In fact, such rules often fail on more specific and rarer devices. For example, IoT devices are often difficult to classify, with a multitude of medical or industrial devices and sensors that cannot be identified by traditional systems. For those devices, foolproof rules where one can clearly identify the device type in one of the messages from the device' traffic usually does not exist. More generally, with existing solutions, the number of 'UNKNOWN' devices (e.g., those that do not match any rules from existing device profilers) can be as high as 40%, leaving the network with no information for matching policies to the devices.

It may be possible to learn new device types by first clustering their behaviors and seek device type labels for the clusters through active labeling. However, clustering algorithms rely on a notion of proximity in a high-dimensional space to decide which examples should be in the same cluster, and which examples should reside in different clusters. It is not surprising, then, that the clustering task is highly sensitive to the underlying metric. Indeed, if the behavioral examples could be accurately represented as a vector whose dimensions capture equally important properties of the device, then one could use the Euclidean distance to cluster similar devices for active labeling.

Unfortunately, the above assumption does not hold true in the real world. First, the behavioral information about the devices includes a fusion of different networking protocols invoked by the device, logs, and activity patterns. Some of these characteristics are very distinctive while others do not matter at all. Designing a meaningful feature representation is a challenging task, even with a lot of expertise. One approach to increase the confidence in the metric and, ultimately, improve the quality of the clustering is to 'learn' the metric. More specifically, metric learning refers to the practice of learning or inferring the distances between points in the space in which the examples are represented.

As the famous "no free lunch" theorem by Wolpert implies, metric learning, like any learning task, requires both making an assumption about the structure of the metric, as well as some information to guide the search for the best instantiation. The latter is often referred to as side information. For the sake of completeness, it is worthwhile mentioning that there exist metric learning frameworks that do not assume access to side information. However, these approaches usually result in a metric or refined space that is optimized for some general criteria and not necessarily for a specific application. They are, therefore, less suitable for an accuracy critical task such as the device classification.

Device Type Classification Using Metric Learning in Weakly Supervised Settings

The techniques herein introduce a series of mechanisms to collect so-called side information that can then be used to perform metric learning for the purpose of clustering devices in a device classification system. Learning a distance metric based on both user feedback and additional side information allows the service to adaptively learn how devices should be grouped, instead of relying exclusively on hard-coded prior knowledge.

Specifically, a device classification service receives telemetry data indicative of behavioral characteristics of a plurality of devices in a network. The service obtains side information for the telemetry data. The service applies metric learning to the telemetry data and side information, to construct a distance function. The service uses the distance function to cluster the telemetry data into device clusters. The service associates a device type label with a particular device cluster.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 5:
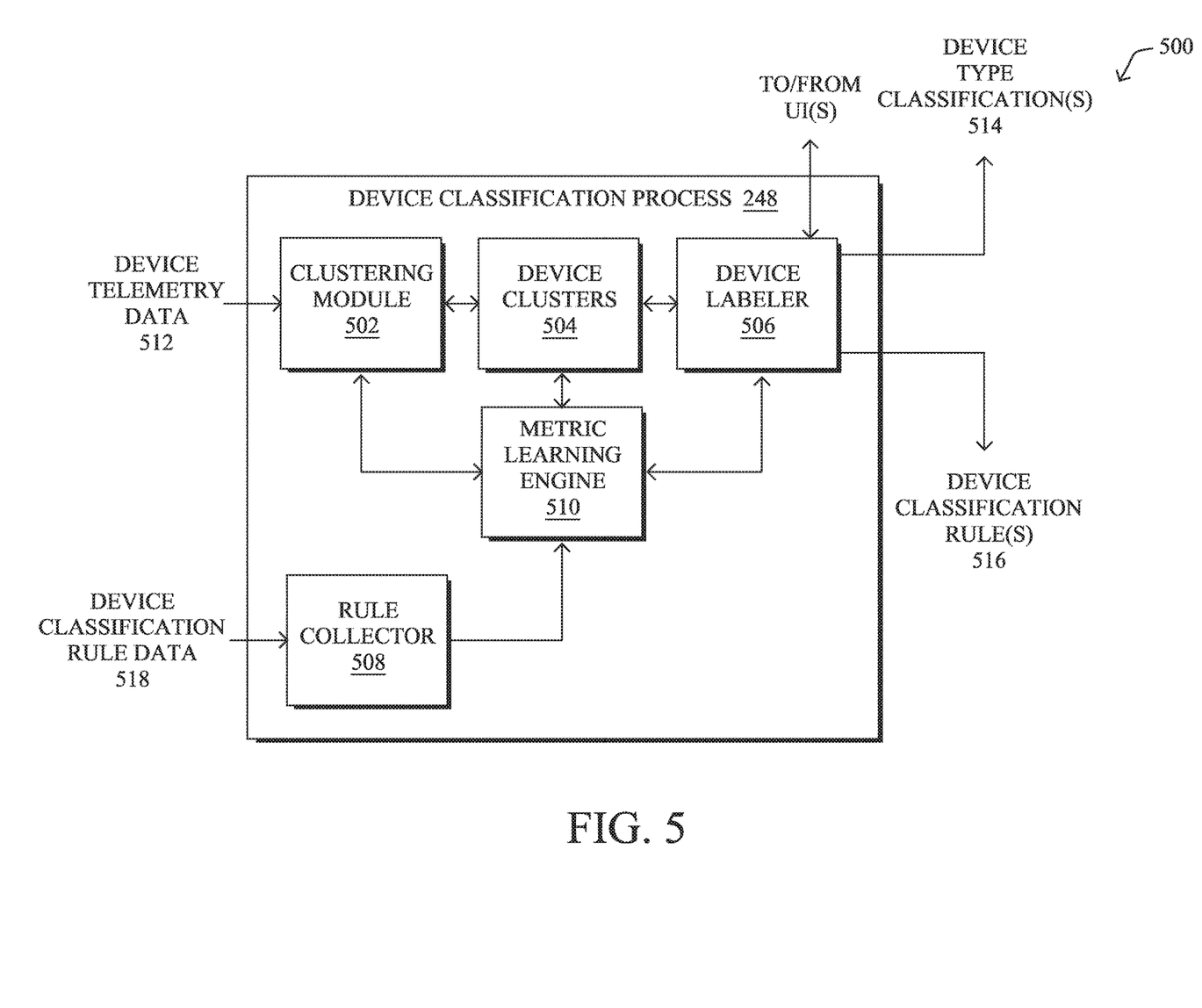
FIG. 5 illustrates an example architecture for a device classification process.

Operationally, FIG. 5 illustrates an example architecture 500 for device classification process 248, according to various embodiments. As shown, device classification process 248 may include any or all of the following components: clustering module 502, device clusters 504, device labeler 506, rule collector 508, and/or metric learning engine 510, to provide a device classification service to one or more networks. These components 502-510 may be implemented in a distributed manner or implemented on a single device. In addition, some or all of components 502-510 may be implemented as part of a monitored network (e.g., at the network edge) or part of a cloud-based device classification service. For example, in some implementations, a cloud-based device classification service may perform centralized rule generation for any number of networks that perform the classifications, locally. The functionalities of the components 502-510 of architecture 500 may also be combined, omitted, or implemented as part of other processes, as desired.

As shown, device classification process 248 may receive device telemetry data 512 regarding any number of devices observed in a network. Such device telemetry data 512 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 512 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification 514 for a device under scrutiny, thereby allowing the receiving entity to apply network policies to the device, based on its device type classification 514. For example, one such network policy may cause a networking device to prevent an MRI machine from accessing the Internet or another resource via the network.

In various embodiments, the components 502-510 of device classification process 248 may leverage active learning, to assign device type classifications 514 to the devices under scrutiny. To do so, clustering module 502 may assign the devices under scrutiny to device clusters 504, based on their telemetry data 512. For example, a device cluster 504 may include those devices that exhibit the same or similar traffic or other behavioral features. If a device type is then associated with a device cluster 504, device labeler 506 may apply that type to a device as device type classification 514. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 512 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 512 for the device. In some embodiments, clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 512 can be captured. Generally speaking, the more telemetry data regarding the behavior of the device, the greater the accuracy of the resulting device type classification 514. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 516 for a given device cluster 504, based on its associated telemetry data 512 and the device type labels obtained from experts through active learning. For example, device labeler 506 may aggregate the labels obtained from the experts, to form a finalized device type classification label for the device cluster 504, using any number of conditions (e.g., whether a threshold number of the labels agree, the majority of labels, etc.). In turn, device labeler 506 may associate this label with the telemetry data 512 representative of the device cluster 504, such as the centroid of the cluster, etc.

By generating a device classification rule 516, device labeler 506 can then use this rule to quickly assess the telemetry data for new devices on the network(s). In addition, device labeler 506 can also deploy device classification rule 516 to any number of Identity Service Engines (ISEs) and/or device classification or profiling services in the network(s), to perform the device classifications, locally. This allows every new device appearing on the network and matching device classification rule 516 to be identified with the corresponding device type.

For purposes of illustration, a device classification rule 516 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc.

While the application of a clustering algorithm based on the notion of proximity in the feature space may be suitable in some cases, clustering devices together that are actually of different types can lead to incorrect device type classifications 514 and/or device classification rules 516. According to various embodiments, this clustering can be improved through the use of metric learning with side information, which may take the form of pairwise comparisons between the characteristics/telemetry of devices. More specifically, let there be a set of N-number of devices $D=\{d_1, \ldots d_N\}$ represented in an n-dimensional space $R^n$ (or a subset thereof). As detailed below, the techniques herein introduce two key mechanisms to allow for metric learning in $R^n$.

In various embodiments, one aspect of the techniques herein is the ability of device classification process 248 to select pairs of devices that are clearly similar or, on the contrary, clearly dissimilar. More specifically, metric learning engine 510 may select pairs of devices, as represented by their features from telemetry data 512, that are similar (e.g., within a threshold distance) or dissimilar (e.g., exceeding a threshold distance). In turn, metric learning engine 510 may send the selected pairs for review by an expert. For example, metric learning engine 510 may send pairs of feature vectors representing two devices to device labeler 506 which, in turn, sends the information to the UI for confirmation that the pair is similar or dissimilar.

Metric learning engine 510 can select device pairs for review using heuristics (e.g., selecting devices that are close to each other in $R^n$, yet not clustered together) or by using expected information gain maximization schemes. In yet another embodiment, metric learning engine 510 could also create subgroups of devices and their discriminating attributes could be displayed as a summary in place of the set of the devices themselves. Note that this information could be inferred by engine 510. For example, when device labeler 506 requests that a user provide a label for a given device cluster 504, the user may also have the option of 'rejecting' the clustering itself, thus not providing a label because he or she believes that the devices in the cluster are not actually similar and should not have been clustered together by clustering module 502. Optionally, the user may also provide the reason, which can be used for distance learning.

In some instances, device classification process 248 may also include a rule collector 508 configured to collect device classification rule data 518 from any rule-based profiling or classification services in the network (e.g., an ISE, etc.). In general, classification rule data 518 will specify both the device type label and the conditions of a given rule. Such labels are typically available only for a subset of the full set of devices in the network, but they can still be leveraged by metric learning engine 510 for metric learning. Note that process 248 may use multiple such third-party label sources, thus inducing a ranking on the comparison: two devices may be "more or less" similar depending on how many labels they have in common. In another embodiment, the reliability of the different sources can be adjusted by an expert via the UI, in order to give more weight to the various labels.

Based on the device classification rule data 518, as well as the results of the pairwise device comparisons made via the UI (e.g., the 'side information'), metric learning engine 510 may perform metric learning. This side information may take either or both of the following forms:

Pairwise similarity and dissimilarity information: e.g. $D^S=\{(d_{i1}, d_{j1}), \ldots (d_{iL}, d_{jL})\}$ are pairs of similar devices and $D^{NS}=\{(d_{i1}, d_{j1}), \ldots (d_{iM}, d_{jM})\}$ are pairs of dissimilar devices.

Partial labeling of the examples: e.g., a partition of a subset $D^{partial}$ of D (i.e., some of the devices have already been grouped according to their type).

The output of the metric learning procedure by metric learning engine 510 is a distance function $F_A(d_i, d_j)=\alpha$, wherein $d_i$ and $d_j$ are vectors in $R^n$ representing two devices. This distance function is then used in a second step by clustering module 502 to find a partition of the devices D into clusters $C_1, \ldots C_k$, thereby improving the formation of clusters 504 for active labeling via device labeler 506.

In one embodiment, $F_A$ may take the form of a simple weighted linear combination of $d_i$ and $d_j$, in which case A may take the form of an n-dimensional weight vector. In more complex embodiments, $F_A$ may become non-linear and take the form of a neural network or another regression model whose input are the stacked vectors $d_i$ and $d_j$, and the output is alpha. In another embodiment, the full distance function may be built by combining multiple classical distances between parts of the feature representation. The metric learning process then consists in figuring out which distances to use for each part of the feature representation, as well as how to combine the resulting values into one distance. This can be considered a "parametric" simplification of the more general metric learning problem.

More specifically, and for the sake of providing a succinct description, assume that we are interested in a parametrized distance function, using A to denote the set of parameters. However, we can use the same framework with a different, not necessarily parametric form of the distance function. The procedure for metric learning with clustering then becomes:

Scenario 1—there are enough pairwise-comparisons from the start:

Use the pairwise constraints to fully learn the distance function $F_A(d_i, d_j)$. As indicated above this can be done in many ways, as desired. For example, this can be achieved by solving the following:

$$\arg\max_{A \geq 0} \sum_{d_i, d_j \in D^{\mathcal{E}}} F_A(d_i, d_j) \text{ s.t.} \sum_{d_i, d_j \in D^{NS}} F_A^2(d_i, d_j) 1$$

Learn the clustering of the devices using $F_A(d_i, d_j)$. In most clustering algorithms plugging-in the learned distance function will be straight-forward. For example, in K-means the objective function can be written as:

$$\arg\min_{Clustering\{C_1,\ldots,C_k\}} \sum_{\ell=1}^{k} \frac{1}{2|C_\ell|} \sum_{d_i, d_j \in C_\ell} F_A^2(d_i, d_j)$$

Scenario 2—there aren't enough pairwise-comparisons:

In an iterative manner query the pairwise labels of examples that lie within an uncertainty area. This can be determined in many ways.

Apply the two steps described in Scenario 1 and measure the performance of the resulting clustering.

If, instead of pairwise comparison, there is only partial labeling of the devices, additional "ranking" constraints can also be incorporated (e.g., $d_i$ is more similar to $d_j$ than to $d_k$). This should then result in a more accurate metric, too.

Figure 6:
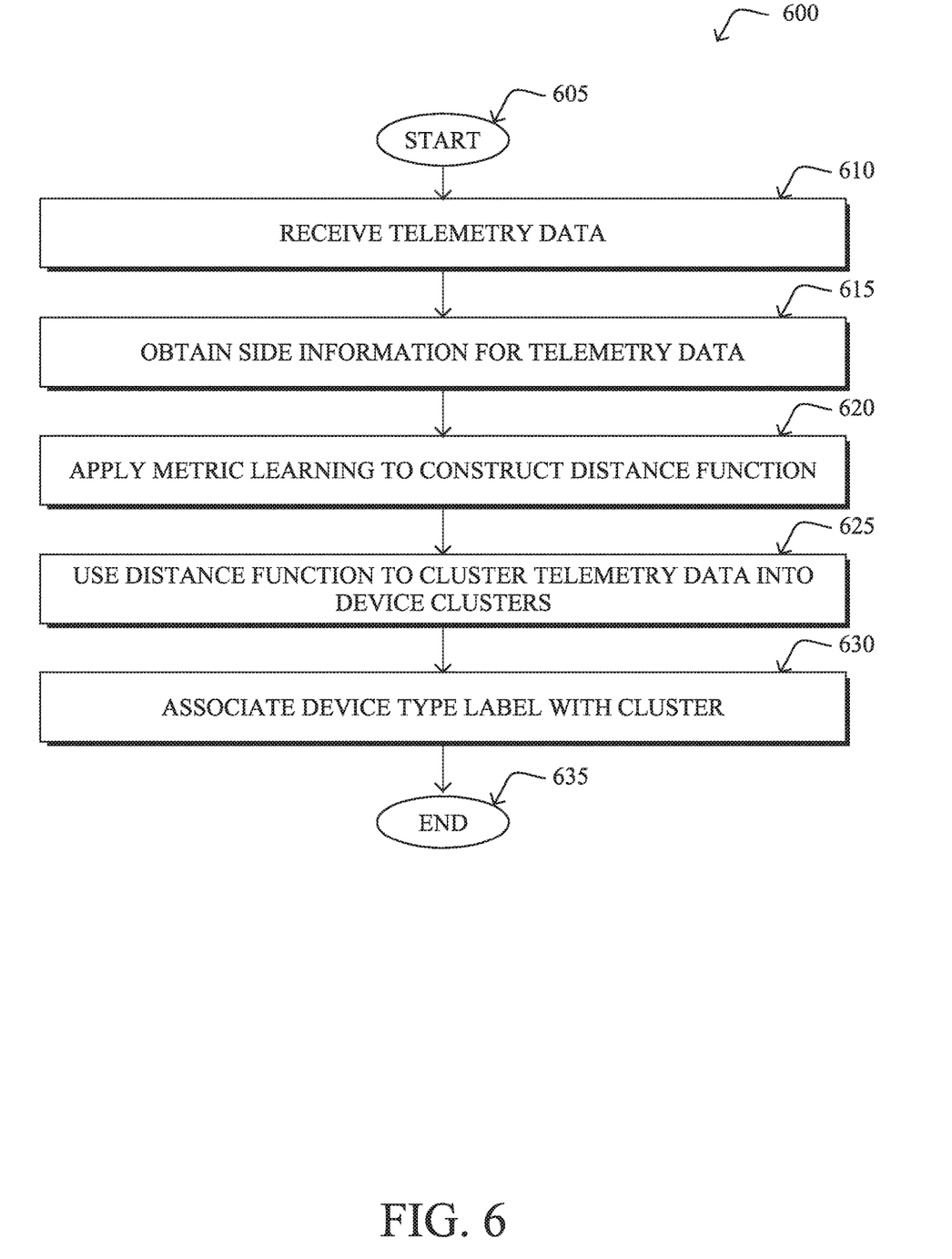
FIG. 6 illustrates an example simplified procedure for using metric learning for device type classification.

FIG. 6 illustrates an example simplified procedure for using metric learning for device type classification, in accordance with one or more embodiments described herein. For example, a non-generic, specifically configured device (e.g., device 200) may perform procedure 600 by executing stored instructions (e.g., process 248), to provide a device classification service to one or more networks. The procedure 600 may start at step 605, and continues to step 610, where, as described in greater detail above, the service receives telemetry data indicative of behavioral characteristics of a plurality of devices in a network. For example, such behavioral characteristics may be captured through observation of the traffic of a particular device in the network and indicate the protocol(s) used by the traffic, user agent, the source and/or destination of the traffic, timing information, packet size information, an application associated with the traffic, combinations thereof, or any other information regarding the behavior of the device on the network.

At step 615, as detailed above, the service may obtain side information for the telemetry data. As would be appreciated by one skilled in the art of machine learning, side information generally refers to data that does not appear in the input feature space (e.g., the telemetry data from step 610), but can help learn a mapping between the input feature space and the output space. More specifically, in the context of labeling devices in a network with device types, such side information can help to better cluster similarly behaving devices in the network.

In some embodiments, this side information may take the form of device type labels for a subset of the plurality of devices. For example, the service may receive, via one or more user interfaces, groupings of devices according to their type. In further embodiments, the side information may take the form of data indicative of whether pairwise sets of the plurality of devices are similar or dissimilar. In this case, the service may select pairs of devices from the plurality of devices and provide the telemetry data from the selected pairs to the user interface(s), to obtain indications as to whether the pair of devices are similar. In some cases, the service may select a pair of devices based on the telemetry data for the pair of devices being close to each other in a feature space and the pair of devices not belonging to the same device cluster. In yet another embodiment, the side information may take the form of a rejection of an existing clustering of devices, if the user believes a cluster formed by the service includes devices of different types.

At step 620, the service may apply metric learning to the telemetry data and side information, to construct a distance function, as described in greater detail above. In some instances, the function may take the form of a simple weighted linear combination of devices $d_i$ and $d_j$, as represented by their behavioral characteristics/features, along with an n-dimensional weight vector. In more complex implementations, the function may take the form of a neural network or regression model that takes the two devices as input. In yet another embodiment, the function may be constructed using distances between parts of the feature representations (e.g., based on their Euclidean distance in the feature space, etc.).

At step 625, as detailed above, the service may use the distance function to cluster the telemetry data into device clusters. For example, the service may use the distance function with k-means clustering, DB-scan, or the like, to group similarly behaving devices, according to their telemetry data, into device clusters. As would be appreciated, by leveraging the distance function learned via metric learning to perform the clustering, the resulting device clusters should demonstrate a greater degree of similarity than by simply applying a base clustering algorithm to the telemetry data alone.

At step 630, the service may apply a device type label with a particular device cluster, as described in greater detail above. Such a label may, for instance, indicate a device manufacturer, a device model, or device version for the devices in the cluster. In some embodiments, the label can be obtained through active labeling by asking one or more experts for the device type label via one or more user interface(s). In turn, the service can synthesize a rule from the cluster (e.g., a summarization of the common characteristics/features of the devices) that can be used to apply the device type label to new devices on the network. Alternatively, if the new devices also fall within the cluster, the service can propagate the label to those devices, as well. Once a device is labeled by its device type, a corresponding network policy can be applied to that device, such as by restricting the device from accessing certain resources, etc. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for improved clustering of devices in a network based on their behavioral characteristics through the use of metric learning. In some aspects, side information can be obtained to adaptively learn how the device should be clustered for purposes of device type classification, instead of relying exclusively on hard-coded prior knowledge.

While there have been shown and described illustrative embodiments that provide for using metric learning in a device classification service, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
 receiving, at a device classification service, telemetry data indicative of behavioral characteristics of a plurality of devices in a network;
 obtaining, by the service, side information for the telemetry data by:
 providing, to a user interface, the telemetry data for a pair of the plurality of devices selected by the service based on a measure of pairwise similarity between their behavioral characteristics, and providing, to the use interface, an option for a user to reject the pair selected based on the measure of pairwise similarity as dissimilar, wherein the side information comprises an indication from the user interface as to whether the user considers the pair to be similar or dissimilar;
 wherein the service selects the pair of devices based on the telemetry data for the pair of devices being close to each other in a feature space and the pair of devices not belonging to the same device cluster;
 applying, by the service, metric learning to the telemetry data and side information, to construct a distance function;
 using, by the service, the distance function to cluster the telemetry data into device clusters; and
 associating, by the service, a device type label with a particular device cluster,
 wherein the service selects the pair of devices based on the telemetry data for the pair of devices being close to each other in a feature space and the pair of devices not belonging to the same device cluster.

2. The method as in claim 1, wherein the device type label is indicative of one or more of: a device manufacturer, a device model, or device version.

3. The method as in claim 1, wherein the side information comprises device type labels for a subset of the plurality of devices.

4. The method as in claim 3, further comprising:
applying device classification rules from one or more other services to the subset of the plurality of devices, to assign device type labels to the devices in the subset.

5. The method as in claim 1, further comprising: assigning the device type label to a particular device in the network, based that device exhibiting similar behavioral characteristics to those of the particular device cluster; and applying a network policy to the device, based on its assigned device type label.

6. An apparatus, comprising:
one or more network interfaces to communicate with one or more networks;
a processor coupled to the network interfaces and configured to execute one or more processes; and
a memory configured to store a process executable by the processor, the process when executed configured to:
receive telemetry data indicative of behavioral characteristics of a plurality of devices in a network;
obtain side information for the telemetry data by:
providing, to a user interface, the telemetry data for a pair of the plurality of devices selected by the apparatus based on a measure of pairwise similarity between their behavioral characteristics, and providing, to the user interface, an option for a user to reject the pair selected based on the measure of pairwise similarity as dissimilar, wherein the side information comprises an indication from the user interface as to whether the user considers the pair to be similar or dissimilar;
wherein the service selects the pair of devices based on the telemetry data for the pair of devices being close to each other in a feature space and the pair of devices not belonging to the same device cluster;
apply metric learning to the telemetry data and side information, to construct a distance function;
use the distance function to cluster the telemetry data into device clusters; and
associate a device type label with a particular device cluster,
wherein the apparatus selects the pair of devices based on the telemetry data for the pair of devices being close to each other in a feature space and the pair of devices not belonging to the same device cluster.

7. The apparatus as in claim 6, wherein the device type label is indicative of one or more of: a device manufacturer, a device model, or device version.

8. The apparatus as in claim 6, wherein the side information comprises device type labels for a subset of the plurality of devices.

9. The apparatus as in claim 8, wherein the process when executed is further configured to: apply device classification rules from one or more services in the network to the subset of the plurality of devices, to assign device type labels to the devices in the subset.

10. The apparatus as in claim 6, wherein the process when executed is further configured to: assign the device type label to a particular device in the network, based that device exhibiting similar behavioral characteristics to those of the particular device cluster; and apply a network policy to the device, based on its assigned device type label.

11. A tangible, non-transitory, computer-readable medium storing program instructions that cause a device classification service to execute a process comprising:
receiving, at the device classification service, telemetry data indicative of behavioral characteristics of a plurality of devices in a network;
obtaining, by the service, side information for the telemetry data by:
providing, to a user interface, the telemetry data for a pair of the plurality of devices selected by the service based on a measure of pairwise similarity between their behavioral characteristics, and providing, to the user interface, an option for a user to reject the pair selected based on the measure of pairwise similarity as dissimilar, wherein the side information comprises an indication from the user interface as to whether the user considers the pair to be similar or dissimilar;
wherein the service selects the pair of devices based on the telemetry data for the pair of devices being close to each other in a feature space and the pair of devices not belonging to the same device cluster;
applying, by the service, metric learning to the telemetry data and side information, to construct a distance function;
using, by the service, the distance function to cluster the telemetry data into device clusters; and
associating, by the service, a device type label with a particular device cluster,
wherein the service selects the pair of devices based on the telemetry data for the pair of devices being close to each other in a feature space and the pair of devices not belonging to the same device cluster.

12. The computer-readable medium as in claim 11, wherein the side information comprises device type labels for a subset of the plurality of devices.

* * * * *

UNITED STATES PATENT AND TRADEMARK OFFICE
CERTIFICATE OF CORRECTION

PATENT NO. : 11,893,456 B2
APPLICATION NO. : 16/434274
DATED : February 6, 2024
INVENTOR(S) : David Tedaldi et al.

It is certified that error appears in the above-identified patent and that said Letters Patent is hereby corrected as shown below:

In the Claims

Column 16, Line 44 should read:
behavioral characteristics, and providing, to the user Signed and Sealed this
Seventh Day of May, 2024

Katherine Kelly Vidal
*Director of the United States Patent and Trademark Office*